United States Patent [19]

Iwasaki

[11] Patent Number: 5,276,710
[45] Date of Patent: Jan. 4, 1994

[54] CARRIER FREQUENCY ERROR DETECTOR CAPABLE OF ACCURATELY DETECTING A CARRIER FREQUENCY ERROR

[75] Inventor: Motoya Iwasaki, Tokyo, Japan

[73] Assignee: NEC Corporation, Tokyo, Japan

[21] Appl. No.: 921,711

[22] Filed: Jul. 30, 1992

[30] Foreign Application Priority Data

Jul. 30, 1991 [JP] Japan .................. 3-212769
Jul. 31, 1991 [JP] Japan .................. 3-214455
Dec. 12, 1991 [JP] Japan .................. 3-350652
Mar. 2, 1992 [JP] Japan .................. 4-044661

[51] Int. Cl.$^5$ .................................. H04L 27/06
[52] U.S. Cl. .................................. 375/94; 375/96; 375/97; 375/86; 329/304
[58] Field of Search ............ 375/94, 96, 97, 114, 375/115, 116, 84, 85, 83, 86; 329/304, 307, 358, 360, 361

[56] References Cited

U.S. PATENT DOCUMENTS 4,485,477 11/1984 Nossen ........................ 375/97
4,726,043 2/1988 Levesque ..................... 375/97
4,829,543 5/1989 Borth et al. ................. 375/96
5,012,491 4/1991 Iwasaki ....................... 375/97
5,031,193 7/1991 Atkinson et al. ............. 375/96

Primary Examiner—Stephen Chin
Attorney, Agent, or Firm—Foley & Lardner

[57] ABSTRACT

On detecting a carrier frequency error in a received signal, a correlation unit (12) detects a correlated signal in signals which a transmission unique word signal in the received signal and a local unique word signal are differentially detected. A frequency fine detection unit (17) detects a fine frequency error by using the correlated signal and a frame timing signal. A frequency coarse detection unit (21) detects a coarse frequency error by using the buffered signal from a data buffer (20) and the frame timing signal. A first adder (25) adds the fine frequency error to the coarse frequency error to a first added signal. A second adder (31) adds the first added signal to a maximum power frequency detected by a maximum power frequency detection unit (27) to produce the carrier frequency error.

15 Claims, 5 Drawing Sheets

CARRIER FREQUENCY ERROR DETECTOR CAPABLE OF ACCURATELY DETECTING A CARRIER FREQUENCY ERROR

BACKGROUND OF THE INVENTION

This invention relates to a carrier frequency error detector for use in a coherent demodulator and, more particularly, to a carrier frequency error detector for use in a coherent demodulator for coherently demodulating a received signal to produce a demodulated signal.

In general, a coherent demodulator of the type described is operable in combination with an incoherent detector for incoherently detecting a received signal in a modulated signal which carries a transmission digital data signal. The modulated signal may be, for example, an N-phase PSK (phase-shift keying) modulated signal where N represents a predetermined integer which is not less than two. The predetermined integer N is usually equal to $2^m$ where m represents a positive integer. The N-phase PSK modulated signal is also called an N-level PSK modulated signal. The N-phase PSK modulated signal is obtained by carrying out N-phase PSK modulation on a transmission carrier signal having a transmission carrier frequency by the transmission digital data signal. In other words, the N-phase PSK modulated signal is obtained by making a phase of the transmission carrier signal to vary as a function of, as a modulating signal, the transmission digital signal digitized by a transmission clock signal having a transmission clock frequency. The transmission digital data signal comprises a plurality of frames each of which includes a transmission unique word signal indicative of a transmission unique word. The modulated signal may be an APSK (amplitude phase-shift keying) modulated signal which is also referred to a QAM (quadrature amplitude modulation) modulated signal.

The incoherent detector is also referred to a plesiochronous detector. The incoherent detector is supplied through a transmission path with the modulated signal. The incoherent detector includes a local oscillator for oscillating a local carrier signal having a local carrier frequency equal to the transmission carrier frequency. The incoherent detector carries out an incoherent detection operation on the modulated signal by using the local carrier signal. The incoherent detector produces an incoherently detected signal indicative of a result of the incoherent detection operation. The incoherently detected signal is supplied to the coherent demodulator as the received signal. It is noted that the local carrier signal is not synchronized in frequency and in phase with the modulated signal. Accordingly, the received signal has a carrier frequency error and an initial phase error with respect to the transmission carrier frequency and a phase of the modulated signal, respectively.

The coherent demodulator comprises a coherent detector, a carrier recovery circuit, and a clock recovery circuit. The coherent detector is supplied with the received signal. In the manner which will later become clear, the coherent detector is also supplied with a reproduced clock signal and a recovered carrier signal from the clock recovery circuit and the carrier recovery circuit, respectively. The coherent detector carries out a coherent detection operation on the received signal on the basis of the reproduced clock signal and the recovered carrier signal to produce a modulated signal having a baseband level. The modulated signal is supplied to the clock recovery circuit and the carrier recovery circuit.

As mentioned above, the received signal is accompanied with the carrier frequency error and the initial phase error. In order to detect the carrier frequency error and the initial phase error in the received signal, the coherent demodulator further comprises a controlling device. The controlling device comprises a frame timing generator, a carrier frequency error detector, and an initial phase error detector. Responsive to the received signal, the frame timing generator generates a frame timing signal indicative of frame timing. Responsive to the received signal, the carrier frequency error detector detects the carrier frequency error in the received signal to produce a carrier frequency error signal indicative of the carrier frequency error. Responsive to the received signal, the initial phase error detector detects the initial phase error in the received signal to produce an initial phase error signal indicative of the initial phase error. The frame timing signal is supplied to the clock recovery circuit while the carrier frequency error signal and the initial phase error signal are supplied to the carrier recovery circuit.

Responsive to the demodulated signal, the clock recovery circuit generates the reproduced clock signal on the basis of the frame timing signal. Responsive to the demodulated signal, the carrier recovery circuit generates the recovered carrier signal on the basis of the carrier frequency error signal and the initial phase error signal.

In the prior art, the carrier frequency error detector comprises a frequency multiplier, a Fourier transformer, and a maximum detector. It will be assumed that the modulated signal is the N-phase PSK modulated signal. The frequency multiplier is supplied with the received signal. The frequency multiplier carries out a frequency multiplier operation on the received signal by a factor N. The frequency multiplier produces a frequency multiplied signal. The frequency multiplied signal is supplied to the Fourier transformer. The Fourier transformer carries out a Fourier transformation operation on the frequency multiplied signal to produce a Fourier transformed signal indicative of bright line spectra. The Fourier transformed signal is supplied to the maximum detector. Responsive to the Fourier transformed signal, the maximum detector detects a peak in the bright line spectra to produce a maximum detected signal as the carrier frequency error signal. At any rate, the conventional carrier frequency error detector detects a maximum power in a frequency range where the carrier frequency error enables to exist. As a result, the conventional carrier frequency error detector is disadvantageous in that there is the possibility of detecting an incorrect carrier frequency error in a case where noise or the like is superimposed on the received signal.

SUMMARY OF THE INVENTION

It is an object of this invention to provide a carrier frequency error detector which can accurately detect a carrier frequency error.

It is another object of this invention to provide a carrier frequency error detector of the type described, which can extremely reduce the possibility of detecting an incorrect carrier frequency error.

Other objects of this invention will become clear as the description proceeds. In accordance with an aspect of the invention, a carrier frequency error detector is used in a coherent demodulator for coherently demodulating a received signal to produce a demodulated signal. The received signal is incoherently detected in an N-phase PSK modulated signal which is obtained by carrying out N-phase PSK modulation on a transmission carrier signal having a transmission carrier frequency by a transmission digital data signal where N represents a predetermined integer which is not less than two. The transmission digital data signal comprises a plurality of frames each of which includes a transmission unique word signal indicative of a transmission unique word. The carrier frequency error detector is for detecting a carrier frequency error in the received signal.

According to an aspect of this invention, the above-understood carrier frequency error detector comprises a local unique word generator for generating a local unique word signal indicative of a local unique word which is identical with the transmission unique word. Supplied with the received signal and connected to the local unique word generator, correlation means carries out correlation operation on signals which the transmission unique word signal in the received signal and the local unique word signal are differentially detected. The correlation means produces a correlated signal indicative of a result of the correlation operation. A frame timing generator generates a frame timing signal indicative of a start time of each of the frames. Connected to the correlation unit and the frame timing generator, frequency fine detection means detects a fine frequency error related to the carrier frequency error in accordance with the correlated signal and the frame timing signal to produce a frequency fine error detected signal indicative of the fine frequency error. Supplied with the received signal, a data buffer buffers the received signal to produce a buffered signal. Connected to the data buffer, the local unique word generator, and the frame timing generator, frequency coarse detection means detects a coarse frequency error related to the carrier frequency error in accordance with the buffered signal, the local unique word signal, and the frame timing signal to produce a frequency coarse error detected signal indicative of the coarse frequency error. Connected to the frequency fine detection means and the frequency coarse detection means, a first adder adds the frequency fine error detected signal to the frequency coarse error detected signal to a first added signal indicative of a result of the addition. Connected to the data buffer and said first adder, a frequency shifter is for frequency shifting the buffered signal on the basis of the first added signal into a frequency shifted signal. Connected to the frequency shifter, maximum power frequency detection means detects a frequency having maximum power in the frequency shifted signal to produce a maximum power frequency detected signal indicative of the frequency having the maximum power. Connected to the maximum power frequency detection means and the first adder, a second adder adds the first added signal to the maximum power frequency detected signal. The second adder produces a second added signal indicative of a result of the addition as a carrier frequency error detected signal indicative of the carrier frequency error.

The correlation means may comprise a first differential detector supplied with the received signal for carrying out differential detection on the received signal to produce a first differential detected signal, a second differential detector connected to the local unique word generator for carrying out differential detection on the local unique word signal to produce a second differential detected signal, and a cross correlator connected to the first and the second differential detectors for calculating cross correlation between the first and the second differential detected signals to produce a cross correlated signal indicative of the cross correlation as the correlated signal.

The frequency fine detection means may comprise a phase detector connected to the correlation means and the frame timing generator for detecting a phase of the correlated signal on the basis of the frame timing signal to produce a phase detected signal indicative of the phase of the correlated signal and a frequency fine detector connected to the phase detector for, in response to the phase detected signal, detecting several discrete frequency fine components related to the carrier frequency error to produce the frequency fine error detected signal indicative of the several discrete frequency fine components as the fine frequency error.

The frequency coarse detection means may comprise a re-modulator connected to the data buffer, the local unique word generator, and the frame timing generator for carrying out re-modulation on the transmission unique word included in each frame of the received signal by using the local unique word signal on the basis of the frame timing signal to produce a re-modulated signal indicative of a result of the re-modulation, a Fourier transformer connected to the re-modulator for carrying out Fourier transformation on the re-modulator signal to produce a Fourier transformed signal indicative of a frequency spectrum for the re-modulated signal, and a frequency coarse detector connected to the Fourier transformer for detecting coarse information related to the carrier frequency error on the basis of a peak frequency in the frequency spectrum indicated by the Fourier transformed signal to produce the frequency coarse error detected signal indicative of the coarse information as the coarse frequency error.

The maximum power frequency detection means may comprise a frequency multiplier connected to the frequency shifter for frequency multiplying the frequency shifted signal by a factor N, the frequency multiplier producing a frequency multiplied signal, a Fourier transformer connected to the frequency multiplier for carrying out Fourier transformation on the frequency multiplied signal to produce a Fourier transformed signal indicative of a frequency spectrum for the frequency multiplied signal, and a frequency selector connected to the Fourier transformer for selecting a particular one of frequencies in the frequency spectrum that has the maximum power, the frequency selector producing a selected frequency signal indicative of the particular frequency as the maximum power frequency detected signal.

DESCRIPTION OF THE PREFERRED EMBODIMENT

Figure 1:
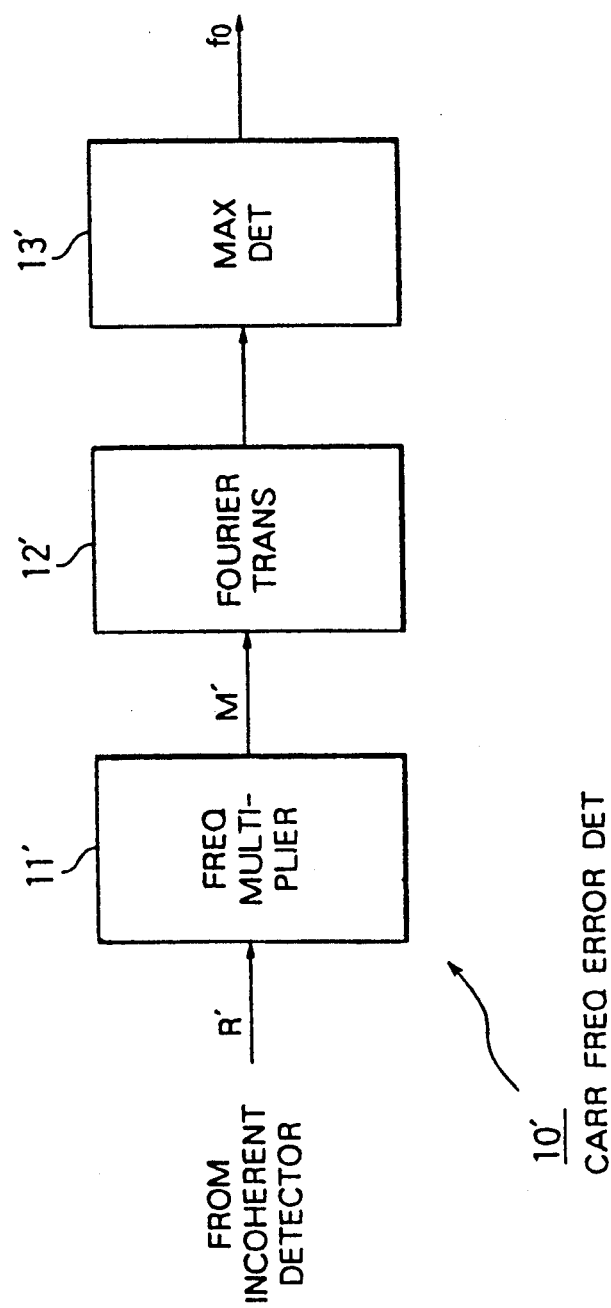
FIG. 1 is a block diagram of a conventional carrier frequency error detector.

Referring to FIG. 1, a conventional carrier frequency error detector 10' will be described in order to facilitate an understanding of this invention.

The carrier frequency error detector 10' is for use in a coherent demodulator (not shown) for coherently demodulating a received signal R'(t) to produce a demodulated signal. The coherent demodulator is operable in combination with an incoherent detector (not shown) for incoherently detecting the received signal R'(t) in a modulated signal which carries a transmission digital data signal S(t). In the example being illustrated, the modulated signal is an N-phase PSK (phase-shift keying) modulated signal where N represents predetermined integer which is not less than two. The predetermined integer N is usually equal to $2^m$ where m represents a positive integer. The N-phase PSK modulated signal is also called an N-level PSK modulated signal. The N-phase PSK modulated signal is obtained by carrying out N-phase PSK modulation on a transmission carrier signal having a transmission carrier frequency by the transmission digital data signal S(t). In other words, the N-phase PSK modulated signal is obtained by making a phase of the transmission carrier signal to vary as a function of, as a modulating signal, the transmission digital signal digitized by a transmission clock signal having a transmission clock frequency. The transmission digital data signal S(t) is represented by as follows:

$$S(t) = e^{j2\pi(k/N)}, \qquad (1)$$

where e represents the base of natural logarithm that is approximately equal to 2.7182818, j represents an imaginary unit which is equal to $\sqrt{-1}$, $\pi$ represents the ratio of the circumference of a circle to its diameter that is approximately equal to 3.141592, k represents an integer varying between zero and (N−1), both inclusive, namely, $0 \leq k < N$.

The transmission digital data signal S(t) comprises a plurality of frames each of which has a period T and includes a transmission unique word signal U(τ) indicative of a transmission unique word.

The incoherent detector is also referred to a plesiochronous detector. The incoherent detector is supplied through a transmission path with the N-phase PSK modulated signal. The incoherent detector includes a local oscillator (not shown) for oscillating a local carrier signal having a local carrier frequency equal to the transmission carrier frequency. The incoherent detector carries out an incoherent detection operation on the modulated signal by using the local carrier signal. The incoherent detector produces an incoherently detected signal indicative of a result of the incoherent detection operation. The incoherently detected signal is supplied to the coherent demodulator 10' as the received signal R'(t) It is noted that the local carrier signal is not synchronized in frequency and in phase with the N-phase PSK modulated signal. Accordingly, the received signal R'(t) has a carrier frequency error $f_0$ and an initial phase error $\theta_0$ with respect to the transmission carrier frequency and a phase of the modulated signal, respectively. Without regard to the initial phase error $\theta_0$, the received signal R'(t) is represented by as follows:

$$R'(t) = S(t) \times e^{j2\pi f_0 t}. \qquad (2)$$

In order to detect the carrier frequency error $f_0$ in the received signal R'(t), the coherent demodulator comprises the carrier frequency error detector 10' in the prior art as shown in FIG. 1. The carrier frequency error detector 10' comprises a frequency multiplier 11', a Fourier transformer 12', and a maximum detector 13'. The frequency multiplier 11' is supplied with the received signal R'(t). The frequency multiplier 11' carries out a frequency multiplier operation on the received signal R'(t) by a factor N. The frequency multiplier 11' produces a frequency multiplied signal M'(t) indicative of a result of the frequency multiplier operation. The frequency multiplied signal M'(t) is represented by as follows:

$$M'(t) = (R'(t))^N = e^{j2\pi N f_0 t}. \qquad (3)$$

As apparent from the above-mentioned equation (3), the frequency multiplied signal M'(t) is an unmodulated signal with a modulating component eliminated from the received signal R'(t). The frequency multiplied signal M'(t) is supplied to the Fourier transformer 12'. The Fourier transformer 12' carries out a Fourier transformation operation on the frequency multiplied signal M'(t) to produce a Fourier transformed signal indicative of bright line spectra. Preferably, the Fourier transformer 12' may be a fast Fourier transformer for carrying out a fast Fourier transformation. The bright line spectra have a peak frequency f which is equal to $Nf_0$. The Fourier transformed signal is supplied to the maximum detector 13'. Responsive to the Fourier transformed signal, the maximum detector 13' detects the peak frequency $Nf_0$ in the bright line spectra to obtain the carrier frequency error $f_0$ from the peak frequency $Nf_0$. The maximum detector 13' produces a maximum detected signal as the carrier frequency error signal.

In the manner as mentioned above, the conventional carrier frequency error detector 10' detects a maximum power in a frequency range where the carrier frequency error enables to exist. As well known in the art, noise or the like is practically superimposed on the received signal R'(t). Under the circumstances, the conventional carrier frequency error detector 10' is disadvantageous in that there is the possibility of detecting an incorrect carrier frequency error, as mentioned in the preamble of the instant specification.

Figure 2:
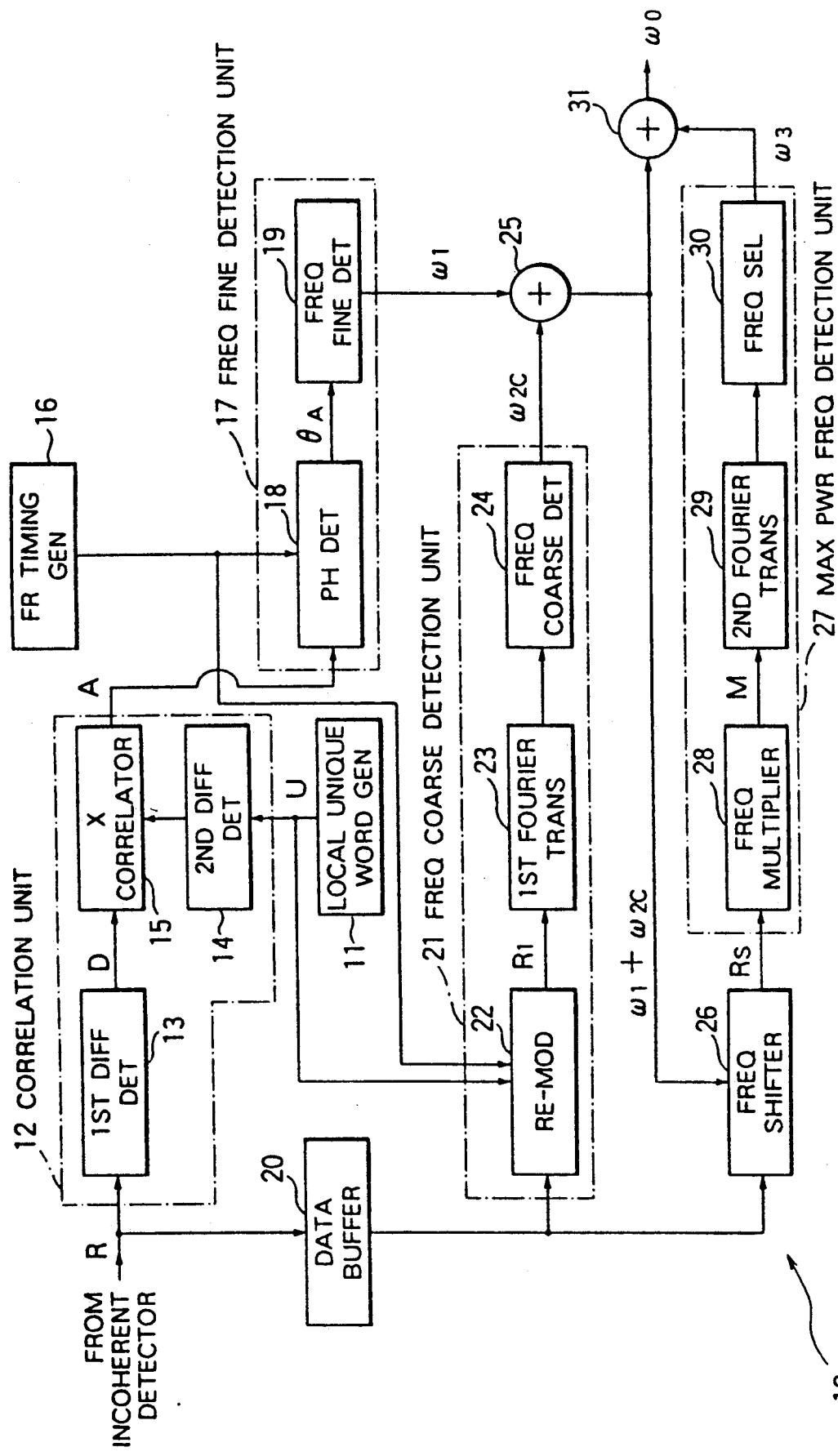
FIG. 2 is a block diagram of a carrier frequency error detector according to a preferred embodiment of the instant invention.

Referring to FIG. 2, the description will proceed to a carrier frequency error detector 10 according to a preferred embodiment of this invention. The carrier frequency error detector 10 is for use in a coherent demodulator (not shown) for coherently demodulating a received signal R(t) to produce a demodulated signal. The coherent demodulator will later be described in more detail with reference to FIG. 4. The received signal R(t) is incoherently detected in an N-phase PSK modulated signal by an incoherent detector (not shown). The N-phase PSK modulated signal is obtained by carrying out N-phase PSK modulation on a transmission carrier signal having a transmission carrier frequency by a transmission digital data signal S(t) where N represents a predetermined integer which is not less than two. As mentioned above, the received signal R(t) has the carrier frequency error $f_0$ and the initial phase error $\theta_0$ with respect to the transmission carrier frequency and the phase of the modulated signal, respectively. As a result, the received signal R(t) is represented by as follows:

$$R(t) = S(t) \times e^{j(\omega_0 t + \theta_0)}, \quad (4)$$

where $\omega_0$ represents an angular velocity error which is $2\pi$ times as large as the carrier frequency error $f_0$.

The transmission digital data signal S(t) comprises a plurality of frames each of which includes a transmission unique word signal $U(\tau)$ indicative of a transmission unique word. Each frame has the period T. The transmission unique word signal $U(\tau)$ has a length which is equal in symbol to L. In other words, the transmission unique word signals $U(\tau)$ are periodically inserted into the transmission digital data signal S(t), that is:

$$S(nT + \tau) = U(\tau), \quad (0 \leq \tau < L/f_s), \quad (5)$$

where n represents an integer, and $f_s$ represents a transmission rate.

The carrier frequency error detector 10 is for detecting the carrier frequency error $f_0$ (the angular velocity error $\omega_0$) in the received signal R(t). The carrier frequency error detector 10 comprises a local unique word generator 11. The local unique word generator 11 generates a local unique word signal $U^*(\tau)$ indicative to a local unique word which is identical with the transmission unique word, where the symbol * represents complex conjugate. The local unique word signal $U^*(\tau)$ is supplied to a correlation unit 12. The correlation unit 12 is also supplied with the received signal R(t). The correlation unit 12 carries out correlation operation on signals which the transmission unique word signal in the received signal R(t) and the local unique word signal $U^*(\tau)$ are differentially detected. The correlation unit 12 produces a correlated signal A(t) indicative of a result of the correlation operation.

More particularly, the correlation unit 12 comprises a first differential detector 13, a second differential detector 14, and a cross correlator 15. Supplied with the received signal R(t), the first differential detector 13 carries out differential detection on the received signal R(t) to produce a first differential detected signal D(t). The first differential detector 12 has a predetermined delay amount which is equal to $T + \Delta t$ where $\Delta t$ represents a predetermined time difference. The predetermined time difference $\Delta t$ may preferably be of the order of $1/f_s$, namely, an interval corresponding to one clock. It is not necessarily so, but the predetermined time difference $\Delta t$ may be a time difference between an interval corresponding to plus several clocks and another corresponding to minus several clocks. Accordingly, the first differential detected signal D(t) is represented by as follows:

$$D(t) = S(t)S^*(t - T - \Delta t)e^{j\omega_0(T + \Delta t)}. \quad (6)$$

During reception of the transmission unique word signal $U(\tau)$, the first differential detected signal D(t) is represented to substitute the equation (5) into the equation (6) as follows:

$$D(nT + \tau) = U(\tau)U^*(\tau - \Delta t)e^{j\omega_0(T + \Delta t)}, \quad (7)$$

$$(\Delta t \leq \tau < L/f_s).$$

Let $U(\tau)U^*(\tau - \Delta t)$ be represented as $U_d(\tau)$ which represents a differential detected unique word signal.

Under the circumstances, the first differential detected signal D(t) is represented during reception of the transmission unique word signal $U(\tau)$ by as follows:

$$D(nT + \tau) = U_d(\tau)e^{j\omega_0(T + \Delta t)}, \quad (\Delta t \leq \tau < L/f_s). \quad (8)$$

As apparent from the equation (8), the first differential detected signal D(t) becomes a fixed pattern without the frequency error during reception of the transmission unique word signal $U(\tau)$.

The second differential detector 14 is supplied with the local unique word signal $U^*(\tau)$ from the local unique word generator 11. The second differential detector 14 carries out differential detection on the local unique word signal $U^*(\tau)$ to produce a second differential detected signal $\omega(\tau)$. The second differential detected signal $\omega(\tau)$ is represented by as follows:

$$\omega(\tau) = U^*(\tau)U(\tau - \Delta t). \quad (9)$$

The second differential detected signal $\omega(\tau)$ is equal to the complex conjugate of the differential detected unique word signal $U_d(\tau)$, that is:

$$\omega(\tau) = U_d^*(\tau). \quad (10)$$

The cross correlator 15 is connected to the first and the second differential detectors 13 and 14. The cross correlator 15 calculates cross correlation between the first and the second differential detected signals D(t) and $\omega(\tau)$ to produce, as the correlated signal A(t), a cross correlated signal indicative of the cross correlation. The cross correlated signal A(t) is represented by as follows:

$$A(t + L/f_s) = \int_0^{L/f_s} D(t + \tau)W(\tau)d\tau \quad (11)$$

$$= \int_0^{L/f_0} D(t + \tau)U_d^*(\tau)d\tau.$$

Inasmuch as the first differential detected signals D(t) coincides with the differential detected unique word signal $U_d(\tau)$ at a time instant $t = nT + L/f_s$, the cross correlated signal A(t) is represented by as follows:

$$A(nT + L/f_s) = \int_0^{L/f_s} U_d(\tau)U_d^*(\tau)e^{j\omega_0(T + \Delta t)}d\tau \quad (12)$$

$$= (L/f_s)e^{j\omega_0(T + \Delta t)}.$$

The frame timing generator 16 generates a frame timing signal indicative of a start time instant of each of the frames. The start time instant coincides with the time instant $t = nT + L/f_s$. The frame timing signal is supplied to a frequency fine detection unit 17. The frequency fine detection unit 17 is supplied with the cross correlated signal A(t) from the correlation unit 11. The frequency fine detection unit 17 detects a fine frequency error related to the carrier frequency error $f_0$ in accordance with the cross correlated signal A(t) and the frame timing signal to produce a frequency fine error detected signal $\omega_1$ indicative to the fine frequency error.

More specifically, the frequency fine detection unit 17 comprises a phase detector 18 and a frequency fine detector 19. The phase detector 18 is connected to the cross correlator 15 and the frame timing generator 16. The phase detector 18 detects a phase of the cross correlated signal A(t) on the basis of the frame timing signal to produce a phase detected signal $\theta_A$ indicative of the phase of the cross correlated signal A(t) at the time instant $t = nT + L/f_s$. That is, the phase detected signal $\theta_A$ is represented by as follows:

$$\theta_A = \tan^{-1}(Im(A)/Re(A)) \qquad (13)$$
$$= \omega_0(T + \Delta t) \pm 2m\pi,$$

where Im(A) represents an imaginary part of the cross correlated signal A(t), Re(A) represents a real part of the cross correlated signal A(t), and m represents an optional integer.

The phase detector 18 is connected to the frequency fine detector 19. Responsive to the phase detected signal $\theta_A$, the frequency fine detector 19 detects several discrete frequency fine component related to the carrier frequency error $f_0$ to produce the frequency fine error detected signal $\omega_1$ indicative of the several discrete frequency fine components as the fine frequency error. The frequency fine error detected signal $\omega_1$ is represented by as follows:

$$\omega_1 = \theta_A/(T+\Delta t) = \omega_0 \pm (2m\pi/(T+\Delta t)). \qquad (14)$$

As apparent from the equation (14), the frequency fine error detected signal $\omega_1$ is equal to the angular velocity error with discrete indefiniteness, $\pm(2m\pi)/(T-\Delta t)$, remained.

Figure 3:
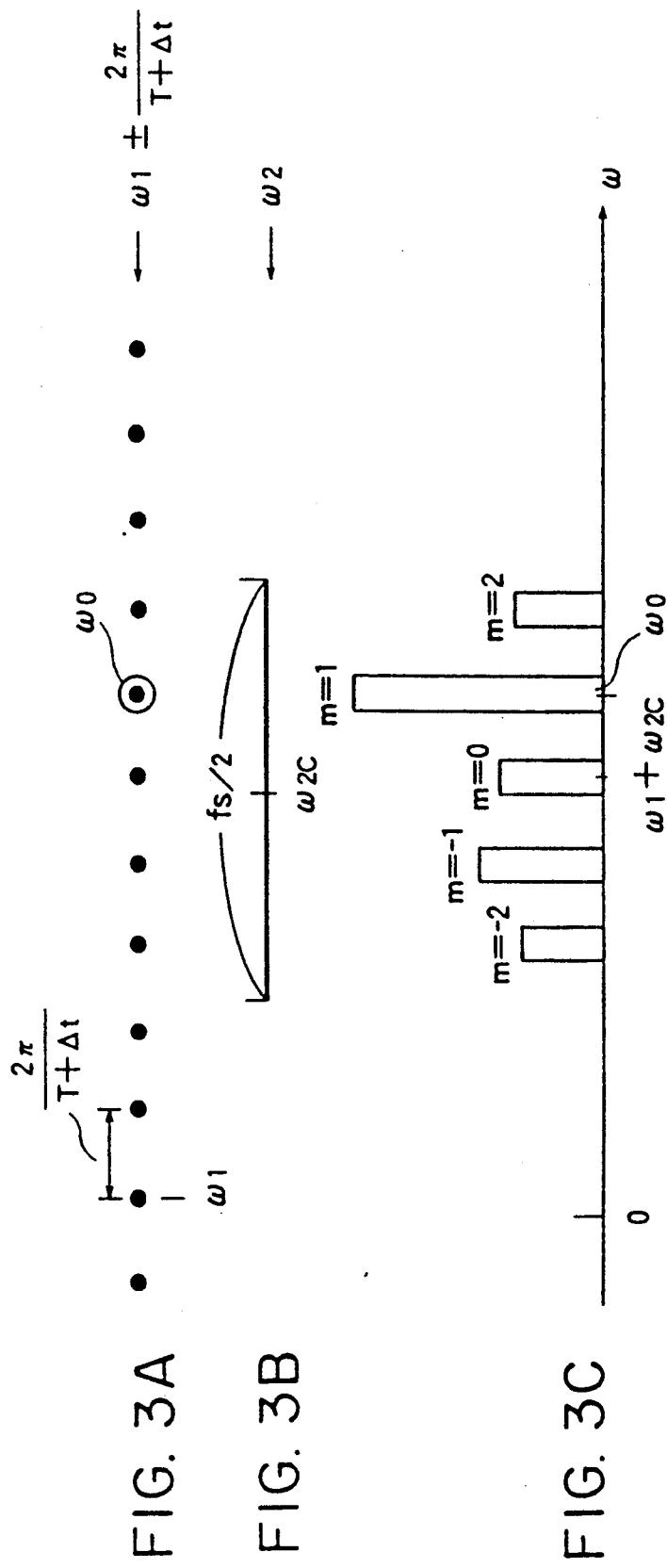
FIGS. 3(a) through (c) show a time chart for use in describing operation of the carrier frequency error detector illustrated in FIG. 2.

FIG. 3(a) shows a state of the frequency fine error detected signal $\omega_1$. The frequency fine error detected signal $\omega_1$ has a larger discrete indefiniteness but has an extremely high precision at a small scale.

Turning back to FIG. 2, in order to eliminate the discrete indefiniteness from the frequency fine error detected signal $\omega_1$, a frequency coarse detection is carried out on the received signal R(t) in the manner which will later be described more in detail. The received signal R(t) is supplied to a data buffer 20. The data buffer 20 buffers the received signal R(t) as a buffered signal. The buffered signal can be read out of the data buffer 20 at any timing. The data buffer 20 is connected to a frequency coarse detection unit 21. The frequency coarse detection unit 21 is supplied with frame timing signal from the frame timing generator 16. The frequency coarse detection unit 21 detects a coarse frequency error related to the carrier frequency error $f_0$ in accordance with the buffered signal and the frame timing signal to produce a frequency coarse error detected signal $\omega_2$ indicative of the coarse frequency error.

More specifically, the frequency coarse detection unit 21 comprises a re-modulator 22, a first Fourier transformer 23, and a frequency coarse detector 24. The re-modulator 22 is connected to the data buffer 20, the frame timing generator 16, and the local unique word generator 11. The re-modulator 22 carries out re-modulation on the transmission unique word U($\tau$) included in each frame of the received signal R(t) by using the local unique word signal U*($\tau$) on the basis of the frame timing signal to produce a re-modulated signal $R_f(t)$ indicative of a result of the re-modulation. The re-modulated signal $R_f(t)$ is represented by as follows:

$$R_f(nT + \tau) = R(nT + \tau) \cdot U^*(\tau) \qquad (15)$$
$$= e^{j(\omega_0(nT+\tau)+\theta_0)}.$$

As apparent from the equation (15), the re-modulated signal $R_f(t)$ is a signal which a modulating component is eliminated from the received signal R(t). The re-modulated signal $R_f(t)$ is supplied to the first Fourier transformer 23. The first Fourier transformer 23 carries out Fourier transformation on the re-modulated signal $R_f(t)$ to produce a first Fourier transformed signal indicative of a frequency spectrum for the re-modulated signal $R_f(t)$. The frequency spectrum has a peak frequency which is nearly equal to the carrier frequency error $f_0$ (the angular velocity error $\omega_0$). The first Fourier transformed signal is supplied to the frequency coarse detector 24. The frequency coarse detector 24 detects coarse information related to the carrier frequency error $f_0$ on the basis of the peak frequency in the frequency spectrum indicated by the first Fourier transformed signal to produce the frequency coarse error detected signal $\omega_2$ indicative of the coarse information as the coarse frequency error. The frequency coarse error detected signal $\omega_2$ has a lower precision of the order of $\pm f_s/4L$. That is, the frequency coarse error detected signal $\omega_2$ is represented by as follows:

$$\omega_2 = \omega_{2c} \pm 2\pi f_s/4L, \qquad (16)$$

where $\omega_{2c}$ represents a central frequency of the frequency coarse error detected signal $\omega_2$.

FIG. 3(b) shows a state of the frequency coarse error detected signal $\omega_2$. The correct estimate value of the carrier frequency error lies in a portion where the frequency fine error detected signal $\omega_1$ and the frequency coarse error detected signal $\omega_2$ overlap each other, but indeterminacy of several points remains. That is, the correct angular velocity error $\omega_0$ is represented by using the frequency fine error detected signal $\omega_1$ and the central frequency $\omega_{2c}$ of the frequency coarse error detected signal $\omega_2$ on the basis of the equations (14) and (16) as follows:

$$\omega_0 = \omega_1 + \omega_{2c} + (2m\pi/T+\Delta t), \, (|m| < (T+\Delta t)f_s/4L). \qquad (17)$$

Turning back to FIG. 2, in order to determine the correct value $m_0$ of the optional integer m in the equation (14), the following operation will be carried out in the manner which will later be described more in detail.

A first adder 25 is connected to the frequency fine detection unit 17 and the frequency coarse detection unit 21. The first adder 25 adds the frequency fine error detected signal $\omega_1$ to the central frequency $\omega_{2c}$ of the frequency coarse error detected signal $\omega_2$ to a first added signal ($\omega_1 + \omega_{2c}$) indicative of a result of the addition. The first added signal ($\omega_1 + \omega_{2c}$) is supplied to a frequency shifter 26. The frequency shifter 26 is connected to the data buffer 20. The frequency shifter 26 frequency shifts the buffered signal on the basis of the first added signal ($\omega_1 + \omega_{2c}$) into a frequency shifted signal $R_s(t)$. The frequency shifted signal $R_s(t)$ is represented by as follows:

$$\begin{aligned} R_s(t) &= R(t)e^{-j(\omega_1+\omega_{2c})t} \\ &= S(t)e^{j[(\omega_0-\omega_1-\omega_{2c})t+\theta_0]} \\ &= S(t)e^{j[(2m_0\pi/(T+\Delta t))t+\theta_0]}. \end{aligned} \qquad (18)$$

The frequency shifter 26 is connected to a maximum power frequency detection unit 27. The maximum power frequency detection unit 27 detects a frequency having maximum power in the frequency shifted signal $R_s(t)$ to produce a maximum power frequency detected signal $\omega_3$ indicative of the frequency having the maximum power. More particularly, the maximum power frequency detection unit 27 comprises a frequency multiplier 28, a second Fourier transformer 29, and a frequency selector 30. The frequency multiplier 28 is connected to the frequency shifter 26. The frequency multiplier 28 frequency multiplies the frequency shifted signal $R_s(t)$ by a factor N. The frequency multiplier 28 produces a frequency multiplied signal M(t). The frequency multiplied signal M(t) is represented by as follows:

$$M(t) = R_s{}^N(t) = e^{j(2Nm_0\pi/(T+\Delta t))t + N\theta_0)}. \quad (19)$$

As apparent from the above-mentioned equation (19), the frequency multiplied signal M(t) is an unmodulated signal. The frequency multiplied signal M(t) is supplied to the second Fourier transformer 29. The second Fourier transformer 29 carries out Fourier transformation on the frequency multiplied signal M(t) to produce a second Fourier transformed signal indicative of a frequency spectrum for the frequency multiplied signal M(t). The second Fourier transformed signal indicates a bright line spectrum. In this event, it is noted that the second Fourier transformer 29 may carry out discrete Fourier transformation in a narrower frequency range. This is because the frequency multiplied signal M(t) has a peak frequency in an extremely restricted frequency range, that is:

$$\omega = 2Nm\pi/(T+\Delta t), \ (|m| < (T+\Delta t)f_s/4L).$$

FIG. 3(c) shows a state of the second Fourier transformed signal. In the example being illustrated, the second Fourier transformed signal has a maximum power at the optional integer m equal to one.

Turning back again to FIG. 2, in order to calculate the maximum power in the second Fourier transformed signal, the second Fourier transformed signal is supplied to the frequency selector 30. The frequency selector 30 selects a particular one of frequencies in the frequency spectrum that has the maximum power. The frequency selector 30 produces a selected frequency signal indicative of the particular frequency as the maximum power frequency detected signal $\omega_3$. The maximum power frequency detected signal $\omega_3$ is represented by as follows:

$$\omega_3 = 2m_0\pi/(T+\Delta t). \quad (20)$$

The maximum power frequency detected signal $\omega_3$ is supplied to a second adder 31. The second adder 31 is supplied with the first added signal $(\omega_1 + \omega_{2c})$ from the first adder 25. The second adder 31 adds the first added signal $(\omega_1 + \omega_{2c})$ to the maximum power frequency detected signal $\omega_3$. The second adder 31 produces a second added signal indicative of a result of the addition as a carrier frequency error detected signal indicative of the carrier frequency error $f_0$. That is, the carrier frequency error $f_0$ (the angular velocity error $\omega_0$) is represented by as follows:

$$\omega_0 = \omega_1 + \omega_{2c} + 2m_0\pi/(T+\Delta t). \quad (21)$$

As apparent from the above-mentioned description, the carrier frequency error detector 10 according to this invention estimates the carrier frequency error by combining discrete and high precision frequency error information derived from the unique word signal inserted in the received signal and another frequency error information derived by carrying out Fourier transformation on the received signal which is frequency multiplied. Accordingly, it is possible to extremely reduce the possibility of detecting an incorrect carrier frequency error. In addition, the estimated carrier frequency error has an extremely high precision.

Figure 4:
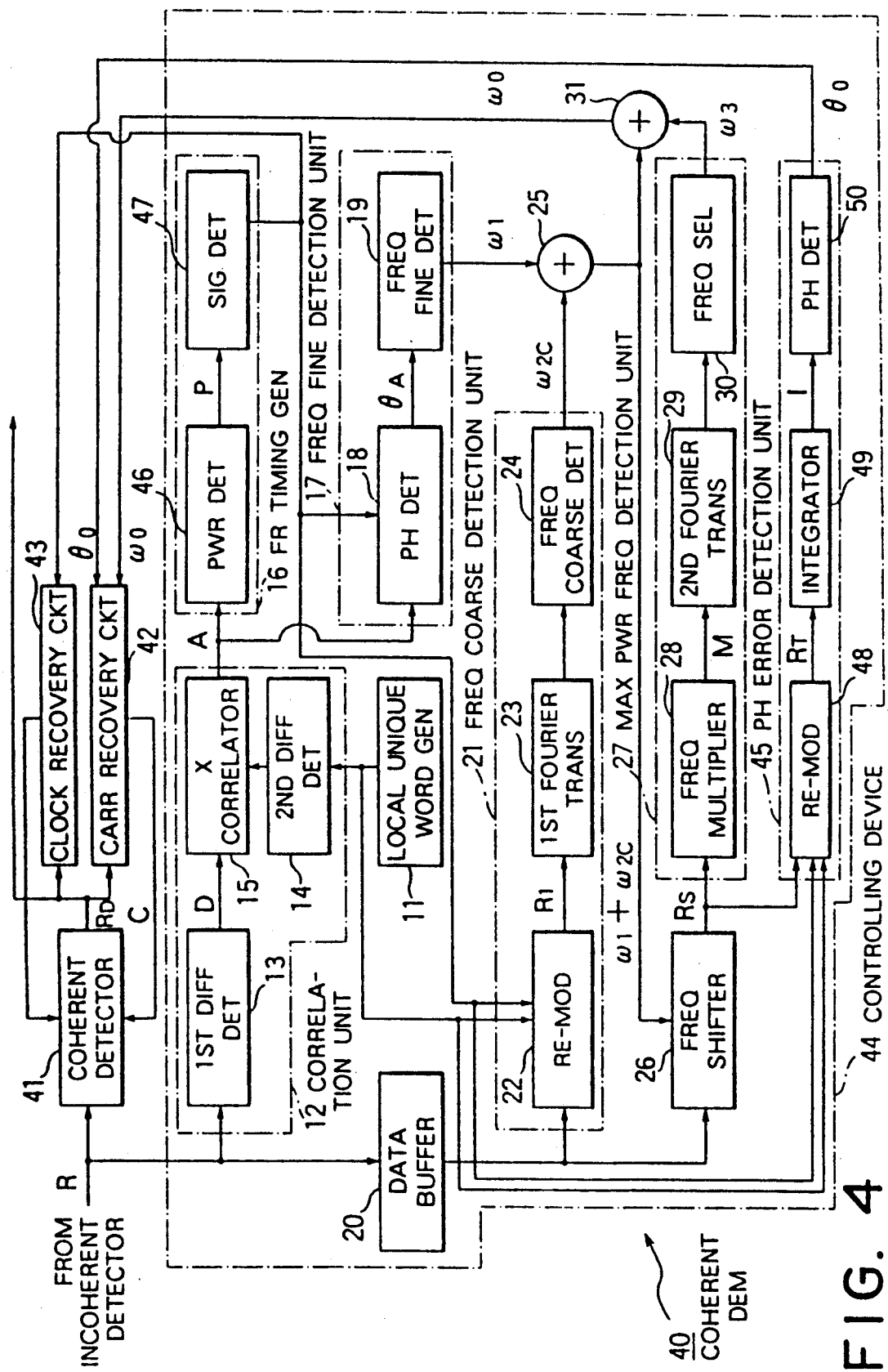
FIG. 4 is a block diagram of a coherent demodulator to which the carrier frequency error detector illustrated in FIG. 2 is applied.

Referring to FIG. 4, the description will proceed to a coherent demodulator 40 to which the carrier frequency error detector 10 illustrated in FIG. 2 is applied. The coherent demodulator 40 comprises a coherent detector 41, a carrier recovery circuit 42, a clock recovery circuit 43, and a controlling device 44 which includes the carrier frequency error detector 10 illustrated in FIG. 2 in the manner which will later become clear.

The coherent detector 41 is supplied with the received signal R(t) from the incoherent detector (not shown). In the manner which will later become clear, the carrier recovery circuit 42 and the clock recovery circuit 43 produce a recovered carrier signal C(t) and a reproduced clock signal, respectively. The recovered carrier signal C(t) and the reproduced clock signal are supplied to the coherent detector 41. The coherent detector 41 carries out a coherent detection on the received signal R(t) on the basis of the recovered carrier signal C(t) and the reproduced clock signal to produce a modulated signal $R_D(t)$ having a baseband level. The modulated signal $R_D(t)$ is supplied to the carrier recovery circuit 42 and the clock recovery circuit 43.

The received signal R(t) is accompanied with the carrier frequency error $f_0$ and the initial phase error $\theta_0$. In the manner which will later become clear, the controlling device 44 detects the carrier frequency error $f_0$ (the angular velocity error $\omega_0$) and the initial phase error $\theta_0$ in the received signal R(t). The controlling device 44 comprises a phase error detection unit 45 as well as the carrier frequency error detector 10 illustrated in FIG. 2.

More specifically, the controlling device 44 comprises the local unique word generator 11, the correlation unit 12, the frame timing generator 16, the frequency fine detection unit 17, the data buffer 20, the frequency coarse detection unit 21, the first adder 25, the frequency shifter 26, the maximum power frequency detection unit 27, the second adder 31, and the phase error detection unit 45. As mentioned above, a combination of the local unique word generator 11, the correlation unit 12, the frame timing generator 16, the frequency fine detection unit 17, the data buffer 20, the frequency coarse detection unit 21, the first adder 25, the frequency shifter 26, the maximum power frequency detection unit 27, and the second adder 31 serves as the carrier frequency error detector 10 illustrated in FIG. 2. In addition, a combination of the local unique word generator 11, the correlation unit 12, the frame timing generator 16, the frequency fine detection unit 17, the data buffer 20, the frequency coarse detection unit 21, the first adder 25, the frequency shifter 26, and the phase error detection unit 45 acts as an initial phase error detector for detecting the initial phase error $\theta_0$ in the received signal R(t).

In the example being illustrated, the frame timing generator 16 comprises a power detector 46 and a signal detector 47. The power detector 46 is supplied with the cross correlated signal A(t) from the correlation unit 12. The power detector 46 detects power in the cross correlated signal A(t) to produce a detected power signal P(t)

indicative of the power. The detected power signal P(t) is represented by as follows:

$$P(t) = |A(t)|^2. \quad (22)$$

The detected power signal P(t) is supplied to the signal detector 47. The signal detector 47 detects a time instant at which the detected power signal P(t) has a maximal value. The signal detector 47 produces the frame timing signal at the time instant.

Figure 5:
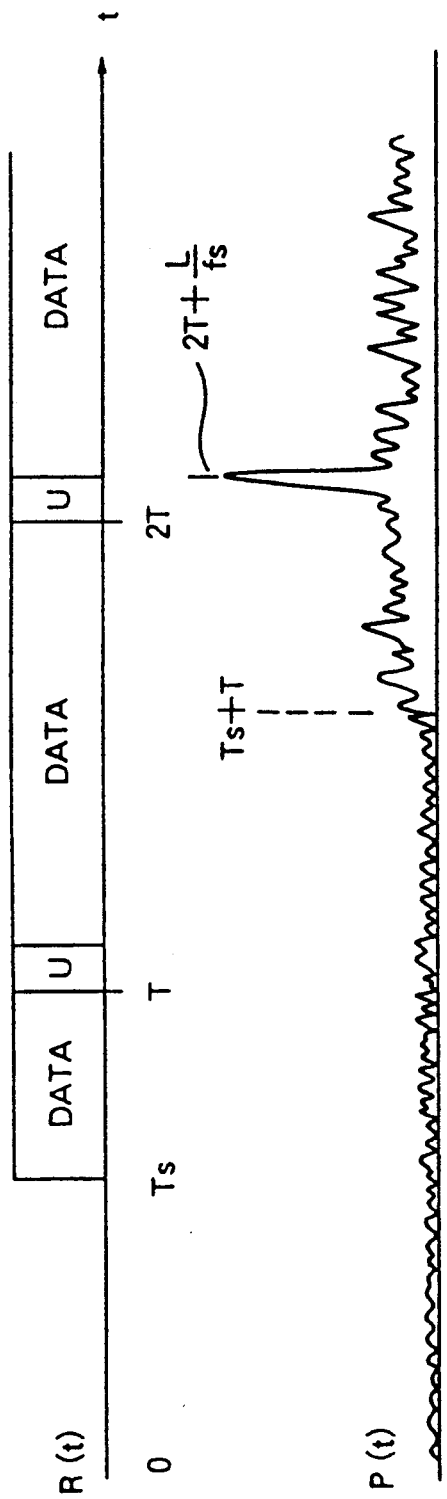
FIG. 5 shows a time chart for use in describing operation of a signal detector for use in the coherent demodulator illustrated in FIG. 4.

Referring to FIG. 5 in addition to FIG. 4, attention will be directed to operation of the signal detector 47. In FIG. 5, the received signal R(t) and the detected power signal P(t) are indicated along first and second lines, respectively. It is assumed that the coherent demodulator 40 starts reception of the received signal R(t) at a time instant $T_s$, and receives a first one of the unique words $U(\tau)$ included in the received signal R(t) at a time instant T and a second one thereof at another time instant 2T. Under the circumstances, the power detector 46 produces the detected power signal P(t) having a relatively smaller noise level due to thermal noise component until a time instant $(T_s+T)$ and then produces the detected power signal P(t) having a relatively larger noise level due to correlation between data in the received signal R(t) after the time instant $(T_s+T)$. The power detector 46 produces the detected power signal P(t) having the maximal value at a time instant $(2T+L/f_s)$. To substitute the equation (12) into the equation (22), the maximal value of the detected power signal P(t) is given by as follows:

$$P(nT+(L/f_s)) = L^2/f_s^2. \quad (23)$$

The signal detector 47 detects the maximal value of the detected power signal P(t) by comparing the detected power signal P(t) with a predetermined threshold value to produce the frame timing signal. The frame timing signal is supplied not only to the re-modulator 22 and the phase detector 18 but also to the clock recovery circuit 43 and the phase error detection unit 45.

The phase error detection unit 45 is also supplied with the frequency shifted signal $R_s(t)$ from the frequency shifter 26. The phase error detection unit 45 detects the initial phase error $\theta_0$ in the received signal R(t) on the basis of the frequency shifted signal $R_s(t)$. More particularly, the phase error detection unit 45 comprises a re-modulator 48, an integrator 49, and a phase detector 50. The re-modulator 48 is connected to the frame timing generator 16 and the local unique word generator 11. The re-modulator 48 carries out re-modulation on the unique words $U(\tau)$ in the frequency shifted signal $R_s(t)$ by using the local unique word signal $U^*(\tau)$ on the basis of the frame timing signal to produce a re-modulated signal $R_T(t)$ indicative of a result of the re-modulation. The re-modulated signal $R_T(t)$ is represented by as follows:

$$\begin{aligned} R_T(nT + \tau) &= R_s(nT + \tau) \cdot U^*(\tau) \\ &= e^{j(2m_0\pi/(T+\Delta t)) \cdot (nT+\tau))}. \end{aligned} \quad (24)$$

The re-modulated signal $R_T(t)$ is supplied to the integrator 49. The integrator 49 integrates the re-modulated signal $R_T(t)$ to compress a noise component. The integrator 49 produces an integrated signal I indicative of a result of integration. Inasmuch as $(2m_0\pi/(T+\Delta t)) \cdot (L/f_s) < 2\pi$, the integrated signal I is represented by as follows:

$$\begin{aligned} I &= \int_0^{L/f_s} R_T(nT + \tau) d\tau \\ &\approx e^{j((2m_0\pi/(T+\Delta t))nT+\theta_0)}. \end{aligned} \quad (25)$$

The integrated signal I is supplied to the phase detector 50. The phase detector 50 detects the initial phase error $\theta_0$ in the integrated signal I at a time instant nT to produce an initial phase error signal indicative of the initial phase error $\theta_0$.

The carrier recovery circuit 42 is supplied with the carrier frequency error signal and the initial phase error signal from the controlling device 44. In addition, the clock recovery circuit 43 is supplied with the frame timing signal from the controlling device 44. In other words, the carrier frequency error signal and the initial phase error signal are initialized in the carrier recovery circuit 42 while the frame timing signal is initialized in the clock recovery circuit 43. Responsive to the demodulated signal $R_D(t)$, the clock recovery circuit 43 generates the reproduced clock signal on the basis of the frame timing signal. Responsive to the demodulated signal $R_D(t)$, the carrier recovery circuit 42 generates the recovered carrier signal C(t) on the basis of the carrier frequency error signal and the initial phase error signal. Just after such an initialization, the coherent detector 41 produces the demodulated signal with clock and phase synchronized. It is therefore possible to rapidly establish reception synchronization.

In addition, a combination of the local unique word generator 11, the correlation unit 12, and the frame timing generator 16 may be also used as a unique word detector for detecting the transmission unique word signal in the received signal to produce a unique word detection signal for the frame timing signal. Such a unique word detector can extremely reduce the possibility of detecting an incorrect transmission unique word signal although the received signal has a reception frquency with a relatively large uncertainty.

What is claimed is:

1. A carrier frequency error detector for use in a coherent demodulator for coherently demodulating a received signal to produce a demodulated signal, said received signal being incoherently detected in an N-phase phase-shift keying (PSK) modulated signal which is obtained by carrying out N-phase PSK modulation on a transmission carrier signal having a transmission carrier frequency by a transmission digital data signal where N represents a predetermined integer which is not less than two, said transmission digital data signal comprising a plurality of frames each of which includes a transmission unique word signal indicative of a transmission unique word, said carrier frequency error detector being for detecting a carrier frequency error in said received signal, said carrier frequency error detector comprising:

a local unique word generator for generating a local unique word signal indicative of a local unique word which is identical with said transmission unique word;

correlation means for differentially detecting said received signal and said local unique word signal to produce a first differential detected signal and a second differential detected signal, respectively, and for correlating said first differential detected signal and said second differential detected signal to produce a correlated signal;

a frame timing generator for generating a frame timing signal indicative of a start time of each of said frames;

frequency fine detection means connected to said correlation means and said frame timing generator for detecting a fine frequency error related to said carrier frequency error in accordance with said correlated signal and said frame timing signal and to produce a frequency fine error detected signal indicative of said fine frequency error;

a data buffer supplied with said received signal for buffering said received signal to produce a buffered signal;

frequency coarse detection means connected to said data buffer, said local unique word generator, and said frame timing generator for detecting a coarse frequency error related to said carrier frequency error in accordance with said buffered signal, said local unique word signal, and said frame timing signal to produce a frequency coarse error detected signal indicative of said coarse frequency error;

a first adder connected to said frequency fine detection means and said frequency coarse detection means for adding said frequency fine error detected signal to said frequency coarse error detected signal to produce a first added signal indicative of a result of addition by said first adder;

a frequency shifter connected to said data buffer and said first adder for frequency shifting said buffered signal on the basis of said first added signal into a frequency shifted signal;

maximum power frequency detection means connected to said frequency shifter for detecting a frequency having a maximum power in said frequency shifted signal to produce a maximum power frequency detected signal indicative of the frequency having said maximum power; and a second adder connected to said maximum power frequency detection means and said first adder for adding said first added signal to said maximum power frequency detected signal, and said second adder producing a second added signal indicative of a result of addition by said second adder as a carrier frequency error detected signal indicative of said carrier frequency error.

2. A carrier frequency error detector as claimed in claim 1, wherein said correlation means comprises:
- a first differential detector supplied with said received signal for carrying out differential detection on said received signal to produce said first differential detected signal;
- a second differential detector connected to said local unique word generator for carrying out differential detection on said local unique word signal to produce said second differential detected signal; and
- a cross correlator connected to said first and said second differential detectors for calculating cross correlation between said first and said second differential detected signals to produce a cross correlated signal indicative of said cross correlation as said correlated signal.

3. A carrier frequency error detector as claimed in claim 1, wherein said frequency fine detection means comprises:
- a phase detector connected to said correlation means and said frame timing generator for detecting a phase of said correlated signal on the basis of said frame timing signal to produce a phase detected signal indicative of said phase of the correlated signal; and
- a frequency fine detector connected to said phase detector for, in response to said phase detected signal, detecting several discrete frequency fine components related to said carrier frequency error to produce said frequency fine error detected signal indicative of said several discrete frequency fine components as said fine frequency error.

4. A carrier frequency error detector as claimed in claim 1, wherein said frequency coarse detection means comprises:
- a re-modulator connected to said data buffer, said local unique word generator, and said frame timing generator for carrying out re-modulation on said transmission unique word included in each frame of said received signal by using said local unique word signal on the basis of said frame timing signal to produce a re-modulated signal indicative of a result of said re-modulation;
- a Fourier transformer connected to said re-modulator for carrying out Fourier transformation on said re-modulated signal to produce a Fourier transformed signal indicative of a frequency spectrum for said re-modulated signal; and
- a frequency coarse detector connected to said Fourier transformer for detecting coarse information related to said carrier frequency error on the basis of a peak frequency in said frequency spectrum indicated by said Fourier transformed signal to produce said frequency coarse error detected signal indicative of said coarse information as said coarse frequency error.

5. A carrier frequency error detector as claimed in claim 1, wherein said maximum power frequency detection means comprises:
- a frequency multiplier connected to said frequency shifter for frequency multiplying said frequency shifted signal by a factor N, said frequency multiplier producing a frequency multiplied signal;
- a Fourier transformer connected to said frequency multiplier for carrying out Fourier transformation on said frequency multiplied signal to produce a Fourier transformed signal indicative of a frequency spectrum for said frequency multiplied signal; and
- a frequency selector connected to said Fourier transformer for selecting one of frequencies in said frequency spectrum that has said maximum power, said frequency selector producing a selected frequency signal indicative of said one of the frequencies as said maximum power frequency detected signal.

6. A coherent demodulator for coherently demodulating a received signal to produce a demodulated signal, said received signal being incoherently detected in an N-phase phase-shift keying (PSK) modulated signal which is obtained by carrying out N-phase PSK modulation on a transmission carrier signal having a transmission carrier frequency by a transmission digital data signal where N represents a predetermined integer which is not less than two, said transmission digital data signal comprising a plurality of frames each of which includes a transmission unique word signal indicative of a transmission unique word, said coherent demodulator comprising:
- a local unique word generator for generating a local unique word signal indicative of a local unique word which is identical with said transmission unique word;

correlation means for differentially detecting said received signal and said local unique word signal to produce a first differential detected signal and a second differential detected signal, respectively, and for correlating said first differential detected signal and said second differential detected signal to produce a correlated signal;

a frame timing generator for generating a frame timing signal indicative of a start time of each of said frames;

frequency fine detection means connected to said correlation means and said frame timing generator for detecting a fine frequency error with respect to said carrier frequency error in accordance with said correlated signal and said frame timing signal to produce a frequency fine error detected signal indicative of said fine frequency error;

a data buffer supplied with said received signal for buffering said received signal to produce a buffered signal;

frequency coarse detection means connected to said data buffer, said local unique word generator, and said frame timing generator for detecting a coarse frequency error with respect to said carrier frequency error in accordance with said buffered signal, said local unique word signal, and said frame timing signal to produce a frequency coarse error detected signal indicative of said coarse frequency error;

a first adder connected to said frequency fine detection means and said frequency coarse detection means for adding said frequency fine error detected signal to said frequency coarse error detected signal to produce a first added signal indicative of a result of addition by said first adder;

a frequency shifter connected to said data buffer and said first adder for frequency shifting said buffered signal on the basis of said first added signal into a frequency shifted signal;

maximum power frequency detection means connected to said frequency shifter for detecting a frequency having a maximum power in said frequency shifted signal to produce a maximum power frequency detected signal indicative of the frequency having said maximum power;

a second adder connected to said maximum power frequency detection means and said first adder for adding said first added signal to said maximum power frequency detected signal, and said second adder producing a second added signal indicative of a result of addition by said second adder as a carrier frequency error detected signal indicative of said carrier frequency error;

phase error detection means connected to said frequency shifter, said local unique word generator, and said frame timing generator for detecting an initial phase error in said received signal on the basis of said frequency shifted signal, said local unique word signal, and said frame timing signal to produce an initial phase error signal indicative of said initial phase error;

a carrier recovery circuit supplied with said demodulated signal and connected to said second adder and said phase error detection means for recovering a recovered carrier signal from said demodulated signal on the basis of said carrier frequency error signal and said initial phase error signal;

a clock recovery circuit supplied with said demodulated signal and connected to said frame timing generator for recovering a reproduced clock signal from said demodulated signal on the basis of said frame timing signal; and a coherent detector supplied with said received signal and connected to said carrier recovery circuit and said clock recovery circuit for carrying out a coherent detection on said received signal on the basis of said recovered carrier signal and said reproduced clock signal to produce said modulated signal.

7. A coherent demodulator as claimed in claim 6, wherein said correlation means comprises:

a first differential detector supplied with said received signal for carrying out differential detection on said received signal to produce said first differential detected signal;

a second differential detector connected to said local unique word generator for carrying out differential detection on said local unique word signal to produce said second differential detected signal; and a cross correlator connected to said first and said second differential detectors for calculating cross correlation between said first and said second differential detected signals to produce a cross correlated signal indicative of said cross correlation as said correlated signal.

8. A coherent demodulator as claimed in claim 6, wherein said frequency fine detection means comprises:

a phase detector connected to said correlation means and said frame timing generator for detecting a phase of said correlated signal on the basis of said frame timing signal to produce a phase detected signal indicative of said phase of the correlated signal; and a frequency fine detector connected to said phase detector for, in response to said phase detected signal, detecting several discrete frequency fine components with respect to said carrier frequency error to produce said frequency fine error detected signal indicative of said several discrete frequency fine components as said fine frequency error.

9. A coherent demodulator as claimed in claim 6, wherein said frequency coarse detection means comprises:

a re-modulator connected to said data buffer, said local unique word generator, and said frame timing generator for carrying out re-modulation on said transmission unique word included in each frame of said received signal by using said local unique word signal on the basis of said frame timing signal to produce a re-modulated signal indicative of a result of said re-modulation;

a Fourier transformer connected to said re-modulator for carrying out Fourier transformation on said re-modulated signal to produce a Fourier transformed signal indicative of a frequency spectrum for said re-modulated signal; and a frequency coarse detector connected to said Fourier transformer for detecting coarse information with respect to said carrier frequency error on the basis of a peak frequency in said frequency spectrum indicated by said Fourier transformed signal to produce said frequency coarse error detected signal indicative of said coarse information as said coarse frequency error.

10. A coherent demodulator as claimed in claim 6, wherein said maximum power frequency detection means comprises:

a frequency multiplier connected to said frequency shifter for frequency multiplying said frequency shifted signal by a factor N, said frequency multiplier producing a frequency multiplied signal;

a Fourier transformer connected to said frequency multiplier for carrying out Fourier transformation on said frequency multiplied signal to produce a Fourier transformed signal indicative of a frequency spectrum for said frequency multiplied signal; and a frequency selector connected to said Fourier transformer for selecting one of frequencies in said frequency spectrum that has said maximum power, said frequency selector producing a selected frequency signal indicative of said one of the frequencies as said maximum power frequency detected signal.

11. A coherent demodulator as claimed in claim 6, wherein said phase error detection means comprises:

a re-modulator connected to said frequency shifter, said local unique word generator, and said frame timing generator for carrying out re-modulation on the unique words in said frequency shifted signal by using said local unique word signal on the basis of said frame timing signal to produce a re-modulated signal indicative of a result of said re-modulation;

an integrator connected to said re-modulator for integrating said re-modulated signal to compress a noise component, said integrator producing an integrated signal indicative of a result of integration; and a phase detector connected to said integrator for detecting said initial phase error in said integrated signal to produce said initial phase error signal.

12. A coherent demodulator as claimed in claim 6, wherein said frame timing generator comprises:

a power detector connected to said correlation means for detecting power in said correlated signal to produce a detected power signal indicative of said power; and a signal detector connected to said power detector for detecting a time instant at which said detected power signal has a maximal value, said signal detector producing said frame timing signal at said time instant.

13. A coherent demodulator as claimed in claim 12, wherein said signal detector detects said maximal value of the detected power signal by comparing said detected power signal with a predetermined threshold value to produce said frame timing signal.

14. A unique word detector for use in a coherent demodulator for coherently demodulating a received signal to produce a demodulated signal, said received signal being incoherently detected in a modulated signal which is obtained by carrying out modulation on a transmission carrier signal having a transmission carrier frequency by a transmission digital data signal including a transmission unique word signal indicative of a transmission unique word, said unique word detector being for detecting said transmission unique word signal in said received signal to produce a unique word detection signal, said unique word detector comprising:

a local unique word generator for generating a local unique word signal indicative of a local unique word which is equal to complex conjugate of said transmission unique word;

a first differential detector supplied with said received signal for carrying out differential detection on said received signal to produce a first differential detected signal;

a second differential detector connected to said local unique word generator for carrying out differential detection on said local unique word signal to produce a second differential detected signal;

a cross correlator connected to said first and said second differential detectors for calculating cross correlation between said first and said second differential detected signals to produce a cross correlated signal indicative of said cross correlation;

a power detector connected to said cross correlator for detecting power in said cross correlated signal to produce a detected power signal indicative of said power; and a signal detector connected to said power detector for detecting a time instant at which said detected power signal has a maximal value, said signal detector producing said unique word detection signal at said time instant.

15. A unique word detector as claimed in claim 14, wherein said signal detector is a level detector for detecting said maximal value of the detected power signal by comparing said detected power signal with a predetermined threshold value to produce said unique word detection signal.

* * * * *